Dec. 8, 1970    D. G. PETERSON ET AL    3,546,622
LASER HAVING CONTROLLED FREQUENCY TRANSLATION
Filed Oct. 29, 1965    2 Sheets-Sheet 1
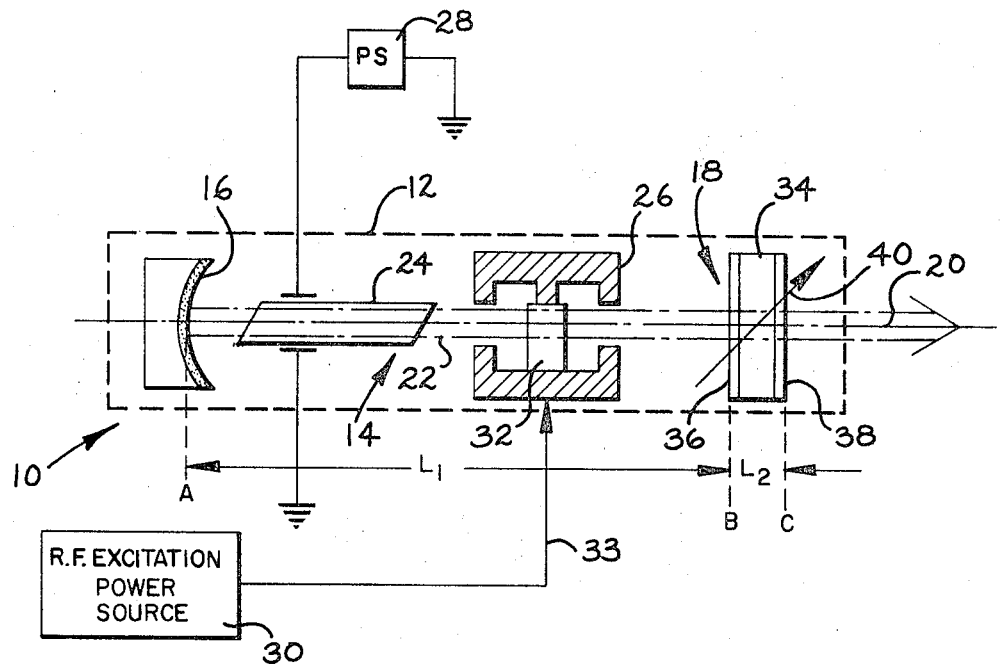
FIG_1
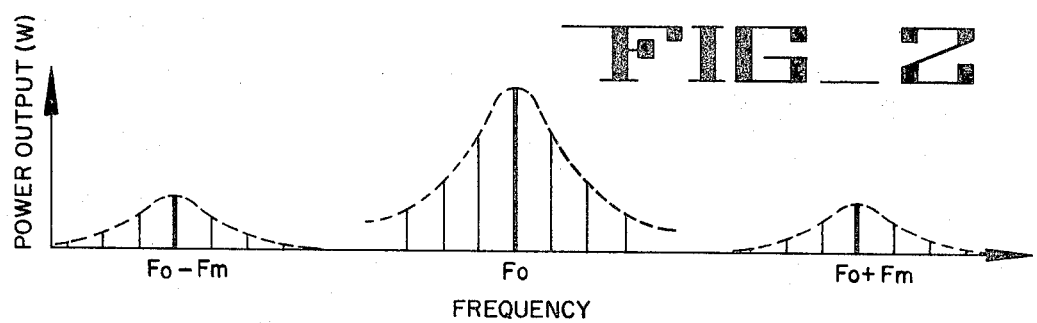
FIG_2
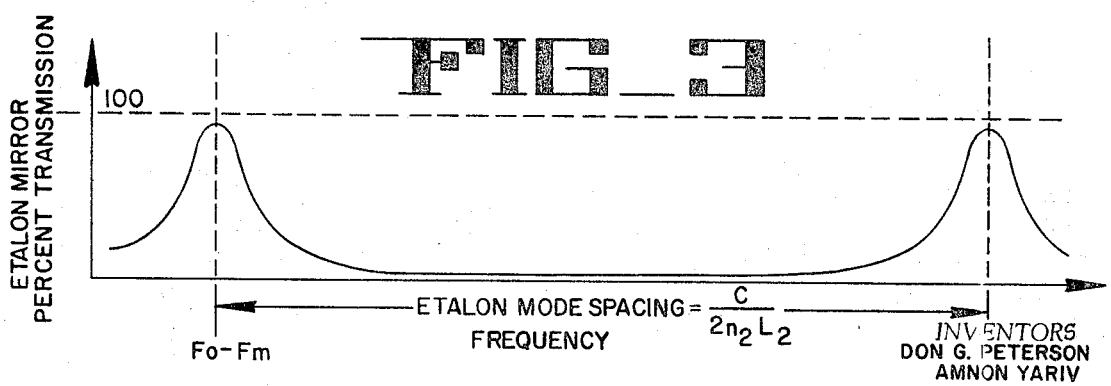
FIG_3
INVENTORS
DON G. PETERSON
AMNON YARIV
BY George Sullivan
Agent

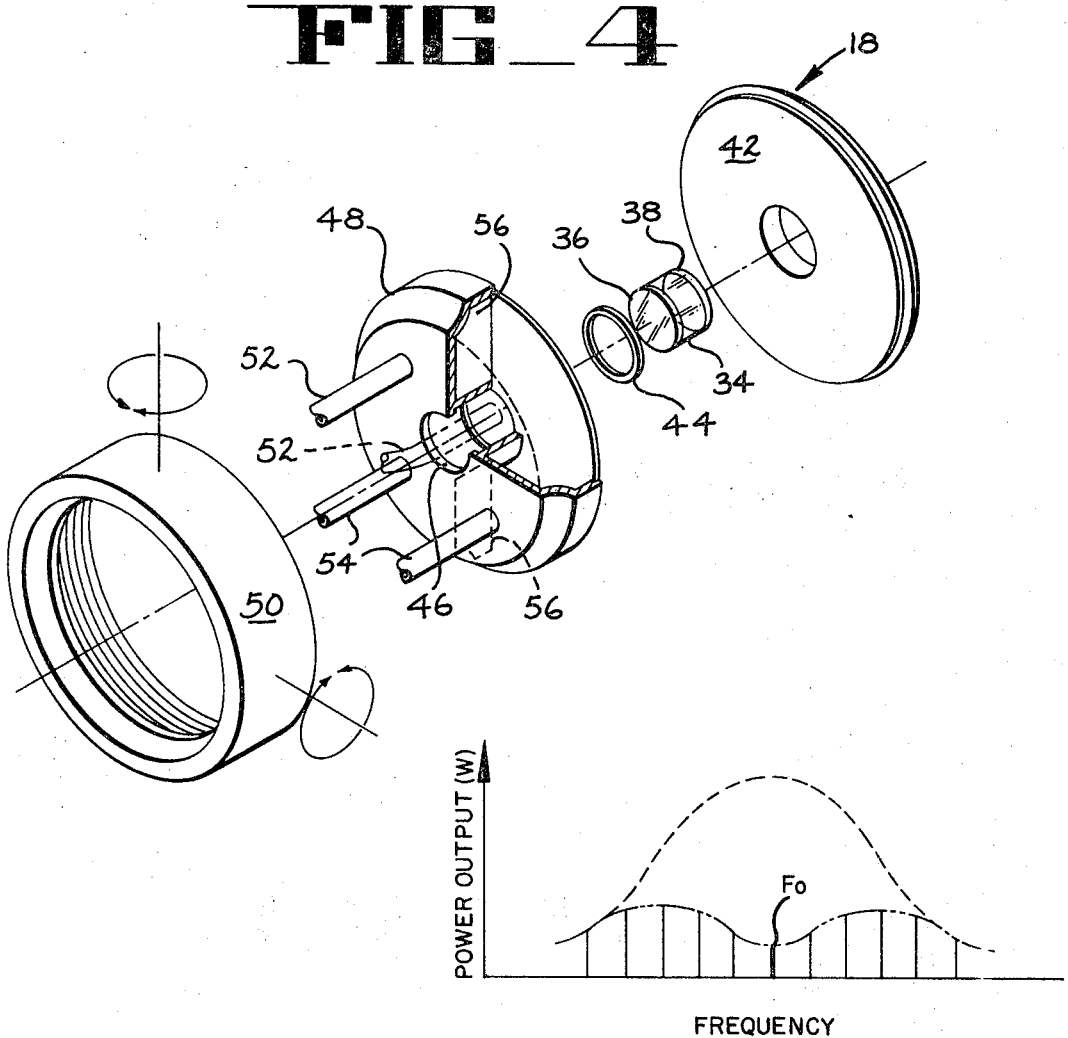
FIG_4
FIG_5
FIG_6
INVENTORS
DON G. PETERSON
AMNON YARIV
BY 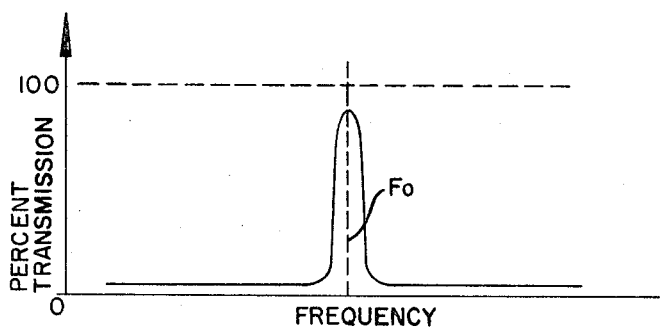
Agent

3,546,622
LASER HAVING CONTROLLED FREQUENCY TRANSLATION

Don G. Peterson, Palo Alto, and Amnon Yariv, Altadena, Calif., assignors to Lockheed Aircraft Corporation, Burbank, Calif.
Filed Oct. 29, 1965, Ser. No. 505,656
Int. Cl. H01s 3/00; G01b 9/02
U.S. Cl. 331—94.5                                5 Claims

ABSTRACT OF THE DISCLOSURE

A parametric optical modulator is disposed within the laser cavity to modulate the cavity energy, which cooperates with a tunable solid state etalon. The tunable solid state etalon functions as a laser cavity end mirror and as an output coupling means.

---

The present invention relates to an improved laser device and more particularly to an improved laser device having internal parametric modulation of the light beam and tunable frequency output coupling.

Both solid state and gas light amplification by simulated emission of radiation devices, hereinbefore and hereinafter referred to as "laser," have been considered for many years as the ultimate hope and solution for space communication systems since laser beams have the potential of carrying large amounts of information over great distances, especially in space environments. To exploit and utilize this potential, techniques must be developed so as to enable the impression of information on the beam to be transmitted by such means as amplitude or frequency modulation, for examples. The principal reason for failure to realize this potential is the inability to efficiently modulate the laser beam.

The prior art has generally utilized external laser modulation techniques consisting essentially of apparatus for placing, end-on-end, pieces of relatively insensitive electro-optical material in the path of an external laser beam to thereby impress information on the external beam to produce a useful communication signal. This technique has proven unsatisfactory because the pieces of relatively insensitive electro-optic material along the path of the beam tend to attenuate power of the beam and are incapable of high index modulation over large information bandwidths.

For these and other reasons known to those skilled in the laser art, external modulation has fallen into disfavor and considerable effort has been expended to modulate the beam inside the optically resonant cavity of the laser by changing the amplitude, polarization, phase, or frequency of the total oscillatory energy stored within the main optical cavity of the laser. For purposes of convenience such modulation will be hereinafter referred to as total internal modulation having a limited modulation bandwidth owing to the high Q of the optical cavity, the cavity transient time and the bandwidth of the oscillatory medium utilized. Normally, output coupling is accomplished by allowing a small percentage of the total internal energy to leak through nearly perfectly reflecting mirrors that form the ends of the main optical cavity. When this type of output coupling is utilized, the over-all process is inefficient for two principal reasons: firstly, because such power may be wasted in attempting to overcome the narrow-band limitations of the optical cavity; and secondly, because only a small percentage of the total modulated energy is made available as useful output energy, owing to the high reflectivity of the mirrors utilized.

In an effort to overcome difficulty encountered with the foregoing external and total internal modulation techniques, more imaginative techniques have been suggested where only a small portion of the total internal cavity energy is modulated and subsequently coupled out in its entirety. Such internal modulation techniques will be referred to hereinafter as "partial internal modulation" or "coupling modulation." Thus, "coupling modulation" will hereinafter be understood to mean a process which employs an energy converting device such as an electro-optic device, for example, to change the character of a small fraction of the total internal energy stored in the laser cavity in such a way that a second device, commonly known as the output coupler, can distinguish between specific modulated energy and the total cavity energy stored in the cavity.

Thus, the function of the output coupler is to couple out or transmit the modulated energy out of the laser cavity with as little attenuation as possible and, at the same time, without measurably affecting the cavity energy so that laser oscillation is maintained. Stated differently, coupling modulation may be though of as a method of coupling the high Q laser cavity modes to low Q output modes by a coupling device at the modulation frequency.

In the prior art amplitude, frequency and the like modulation of a laser beam has been accomplished by (1) polarization rotation, (2) diffraction, or (3) frequency translation or a combination of these.

Both polarization and diffraction techniques have been found to be less satisfactory than frequency translation for the purpose of producing coupling modulation for reasons known by those skilled in the art, and therefore, the details thereof are omitted and only a discussion of frequency coupling modulation will be presented.

Frequency coupling modulation is a modulation process in which a portion of the total internal energy oscillating within the optical cavity is shifted to a new frequency and the energy at this new frequency is then removed from the laser by a frequency selective output coupler. The frequency shifting of a small portion of the internal energy may be accomplished by a "parametric" energy conversion process. This process is called "parametric" because one of the parameters of the medium through which the cavity energy propagates is made to vary in step with an applied modulation signal. The parameter varied is the index of refraction in a short piece of electro-optical material such as single crystal KDP (potassium dehydrogen phosphate) placed within the cavity. The time varying refractive index change causes a time varying phase change in the main oscillatory energy within the optical resonator as it passes through the modulated medium. The result is the generation of new frequencies called side bands at the sum and different frequencies of the optical cavity frequency ($F_o$) and the modulation frequencies ($F_m$), that is, at ($F_o + F_m$) and ($F_o - F_m$). These frequency shifted energy bands can be controlled in amplitude or phase to obtain any desired type of modulation. Thus, a small portion of the main cavity energy oscillating at ($F_o$) has been parametrically transferred to side bands at ($F_o + F_m$) and ($F_o - F_m$) by such modulation. If no special provisions are made for coupling out the side band energy, only a small percentage, if any, of the modulated energy is available as useful output energy through the highly reflective end mirror generally used in the prior art as the output coupler.

A better appreciation of the present invention will be possible by the following further explanation.

The plasma discharge tube or ruby rod employed in many lasers is a coherent optical amplifier that generates an optical cavity energy beam which oscillates within the laser cavity. The energy generated within the cavity is stored at discrete frequencies determined by the modes of the cavity and the excess gain of the plasma tube above the losses of the cavity. When the cavity oscillations are modulated, energy from each mode is capable of being translated to side bands. Thus, if these side bands, in the case of gas lasers, fall outside the bandwidth of the laser gain mechanism, they may be spaced by a microwave frequency from the laser cavity oscillations. However, if the frequency of the side bands overlaps the other oscillating modes in the cavity, mode coupling may occur. Mode coupling is characterized as phase coherent energy exchange between the oscillating modes.

From the foregoing discussion regarding the frequency translation, it can be readily seen that modulation within the laser cavity can be performed. However, this technique is of little use and value as a means of providing useful modulated energy outside the laser unless there is an efficient means for coupling such energy from the laser cavity. Thus, the really difficult problem confronting the prior art has been that of providing an apparatus for extracting energy from the laser resonator in an efficient manner.

Accordingly, it is the broad object of this invention to provide a frequency coupling modulated laser.

Another object of this invention is to provide a frequency coupling modulated laser utilizing a tunable frequency output coupler.

Still another object of this invention is to provide a frequency coupling modulated laser wherein one or more of the oscillatory modes within the cavity may be coupled to a tunable solid state etalon output coupler.

Still a further object of this invention is to provide a frequency coupling modulated laser wherein phase coherent energy transfer occurs between oscillatory modes and all of the energy is removed at a mode frequency selected by the tunable etalon output coupler.

In accordance with the present invention, the above-mentioned objects are achieved by placing a parametric optical modulator in the laser optical resonator to modulate the oscillating cavity energy and then coupling to the modulated cavity energy with a frequency selective output coupler. Utilization of the optical modulator within the laser cavity permits a predetermined amount of the oscillatory cavity energy to be coupled or shifted to new frequencies which is subsequently transmitted to an external use by means of the output coupler in a fashion which would not otherwise be accomplished in the absence of such modulation. More particularly, modulation of the cavity energy causes a frequency shift in a portion of the cavity energy into predetermined side bands which differ from the frequency of the oscillatory modes by the frequency of the modulation. Thus, with a frequency selective output coupler which is capable of differentiating between the frequency of the oscillatory modes of the laser and the newly generated side bands, energy may be coupled from one or more of the newly generated side bands without preventing the generation of laser cavity energy. In accordance with another embodiment of the invention, the oscillatory modes are modulated in a manner such that they exchange energy with each other in a phase coherent manner and thus can transfer energy to the central mode whereupon the output coupler transmits energy out of the laser from the central mode without preventing the generation of cavity energy at the other oscillatory mode frequencies which have contributed part of their energy to the central mode.

The novel features which are believed to be characteristic of the invention both as to its method of construction and operation, together with further objects and advantages thereof, will be better understood from the following descriptions considered in connection with the accompanying drawings in which illustrative embodiments of the invention are disclosed by way of example. It is expressly understood, however, that the drawings are for the purpose of illustration and description only and do not define limitations of the invention.

FIG. 1 is a diagrammatic view of the laser illustrating frequency coupling modulation and tunable frequency output coupling.

FIG. 2 is a graphic plot of the internal power versus frequency of the laser shown in FIG. 1 and illustrates the power distribution of the oscillatory modes of the laser and the side bands resulting from frequency coupling modulation in accordance with the present invention.

FIG. 3 is a graphic plot of two of the many frequency pass bands of a tunable frequency output coupler in accordance with the present invention.

FIG. 4 is a detailed isometric view of the tunable solid state etalon frequency output coupler diagrammatically shown in FIG. 1.

FIG. 5 is a graphic plot of the laser resonator internal power illustrating phase coherent energy exchange contributions to the central frequency mode $(F_0)$ from the adjacent oscillatory modes as a result of frequency coupling modulation and frequency selective output loading of the central mode $(F_0)$ in accordance with the present invention.

FIG. 6 is a graphic plot of a single frequency bandpass characteristic of a tunable frequency etalon output coupler in accordance with the present invention.

With reference now to the drawings, FIG. 1 shows a diagrammatic view of the laser for frequency coupling modulation and tunable frequency output coupling. The apparatus illustrated in FIG. 1 includes a laser device generally designated 10, the component parts thereof which are circumscribed by a broken line 12 which includes a cavity resonator generally designated 14 having a length designated $L_1$ which occupies a space between high reflectance mirror 16 and a pair of spaced-apart mirrors forming an output coupler 18. Disposed within the laser cavity along an imaginary axis designated 20 along which a light beam 22 propagates is a plasma tube 24 for generating laser beam 22 and an optical frequency translating device 26 for modulating various modes in beam 22. There is also provided a power source 28 for energizing plasma laser tube 24 and another power source 30 for energizing optical frequency translating device 26.

Referring now more particularly to laser device 10, mirror 16 is shown as a conventional curved high reflectance mirror to provide some focusing of laser beam 22, while plasma tube 24 may be any suitable coherent light amplifier capable of producing coherent light beam oscillations 22, such as helium and neon, for example, or it may be ruby rod with associated excitation apparatus for generating such a light beam. The optical frequency translating device 26 is disposed between one end of the plasma tube 24 and one of a pair of parallel mirrors 36 forming the output coupler and is shown as a re-entrant cavity having openings therethrough for the passage of the laser beam. In addition, device 26 contains a block of single crystal KDP 32 which has an aperture therethrough for passing the laser beam 22 and is disposed in the center of cavity 26 at the point of maximum electrical field concentration. The energizing power from source 30 is applied to cavity 26 in a conventional manner by a wave guide 33 coupled thereto. However, it should be noted at this point that the optical frequency translating device 26 may be any suitable device capable of modulating beam 22 at any frequency in a suitable manner, such modulation frequencies may be related or unrelated to the mode separation frequency $F_s = C/2L_1$.

Continuing with the description of the laser 10, optical coupler 18 comprises a fused quartz block 34 having parallel optically flat surfaces that are disposed at right angles to the path of the laser beam 22. A first reflectance coating for mirror 36 is deposited on the surface adjacent the laser cavity and together with a second reflectance mirror 38 deposited on the other optically flat surface of the block of fused quartz 34 forms the other end of the laser cavity 12. It should be noted at this point that the optical coupler 18 is shown as having parallel surface elements, but it may have a configuration such that the parallel surfaces are concentric surfaces as opposed to simply parallel plane surfaces. The tuning mechanism for the coupler 18 has been illustrated by an arrow 40 and will be discussed in further detail hereinafter. The spacing between mirrors 36 and 38 is shown as $L_2$ and it determines the frequency of operation for coupler 18. This embodiment of the output coupler is shown as a solid-state device and is hereinafter understood to be an etalon output coupler. The term etalon as used herein is similar to the device known as a Fabray-Perot interferometer. The similarity arises from the fact that two parallel mirrors in close proximity are employed to form an optical cavity having unique interferometer properties.

Operation of the laser is commenced by applying electrical energy to the plasma tube 24 by means of power source 28 which causes excitation of the gas contained in the tube which results in laser action or the generation of a light beam along the imaginary axis 20. The light beam generated as a result of laser action sends waves in the direction of both the high-reflectance mirrors 16 and the coupler 18 which acts as a mirror thereby initiating optical oscillations within the cavity. Once light oscillation within the cavity 14 have commenced, excitation from power source 30 is applied to frequency translation device 26 which in turn causes modulation of the oscillatory modes existing in the beam of cavity 14 thereby initiating a condition for frequency coupling modulation as discussed hereinabove.

In accordance with the present invention, several modes of operation are possible as a result of frequency coupling modulation. More specifically, in practice it has been found if the radio-frequency excitation from source 30 is at a frequency significantly higher than the frequency of the mode separation between oscillatory modes, side bands will be generated which have a relationship to an oscillatory mode of frequency ($F_o$) equal to ($F_o$) plus or minus the modulation frequency ($F_m$). Stated differently, the side bands have a frequency of ($F_o+F_m$) and ($F_o-F_m$). This result can be readily seen by reference to FIG. 2 where by way of example the central oscillating mode is designated a frequency ($F_o$) and the corresponding side bands are at frequency ($F_o-F_m$) and ($F_o+F_m$).

Another mode of operation which may be observed is one which occurs when the excitation from power source 30 has a modulation frequency ($F_m$) equal or nearly equal to the mode separation frequency ($F_s=C/2L_1$) in which case the side bands generated from each oscillatory mode overlaps adjacent oscillatory modes. As a result a phase coherent energy exchange occurs between the oscillatory modes such that the oscillatory modes oscillate with a fixed relative phase instead of random relative phase which may occur without the phase coherent energy exchange between oscillatory modes. This can readily be seen by reference to FIG. 5 wherein ($F_o$) is the selected output mode that would be coupled out of the laser by the output device 18 and the other modes are understood to be contributing energy thereto. Thus, the departure from the normal gain curve envelope shown as the dashed line in FIG. 5 illustrates both heavy coupling or loading of the output mode by the output coupler 18 and phase coherent exchange by the associated oscillatory modes.

With reference now to FIGS. 3 and 6, there is shown a graphic plot of the frequency coupling characteristics of the etalon output coupler 18. FIG. 3 illustrates the fact that the output coupler 18 has recurring frequency transmission bands separated by the mode spacing of the resonant frequency of the coupler which is equal to $C/2n_2L_2$ where C is equal to the velocity of light and $n_2$ is equal to index of refraction in the fused quartz body 34 and $L_2$ is the spacing between the reflective surfaces 36 and 38 deposited on a fused quartz body 34. In FIG. 3 one of the transmission bands for the etalon coupler 18 is adjusted to occur at the frequency of the side band designated ($F_o-F_m$) while in FIG. 6 the bandpass of the output coupler 18 is tuned to ($F_o$) so as to coincide with the central oscillatory mode in cavity 14. In each of these example cases the output coupler is tuned to the frequency indicated and is the frequency of the energy coupled from the laser for external use. It should be noted at that point that the output coupler could be tuned to select any one or more of the oscillatory modes or side bands for output purposes.

In order to more readily appreciate how the etalon output coupler is tuned, reference is made to FIG. 4 wherein the detailed construction of an illustrative coupler is shown. FIG. 4 illustrates that output coupler 18 comprises a primary element including a cylindrical segment of fused quartz 34 having parallel partial reflectance mirrors 36 and 38 deposited on opposite flat surfaces thereof. A rear back-up plate 42 and a front support washer 44 are disposed on opposite sides of the coupler device to provide thermal insulation and mechanical support when the coupler is placed in an opening 46 of a heat exchanger 48 as the whole assembly is firmly secured within gimballed ring mount 50. As shown in FIG. 4, the heat exchanger 48 has two inlet connections 52 and two outlet connections 54 which provide a means for circulating fluids through the heat exchanger. The heat exchanger 48 also includes a pair of partitions 56 which provide means for creating a temperature gradient across the quartz body 34 by controlling the temperature in the divided portions of the heat exchanger.

In operation, the etalon output coupler 18 may be viewed as a high reflectance mirror with transmission bands that are capable of being frequency tuned by changing the index of refraction and the length of the fused quartz 34. In addition, parallelism of the mirrors 36 and 38 can be controlled. Thus, it can readily be seen that the introduction of fluids through inlets 52 which circulate through the heat exchanger 48 provide a means whereby tuning of the etalon coupler may be accomplished by both physical length and index of refraction changes caused in the fused quartz body 34. As indicated above, such action will tend to change the index of refraction or cause a physical change in the spacing between the mirror or create a temperature gradient across the surface of the reflective mirror 36 or all of these. In so doing, the transmission characteristics of the coupler 18 may be readily controlled to thereby provide a means for tuning the coupler to any frequency band. In addition, changing the length ($L_2$) of the fused quartz or the reflectivity of the partial mirrors 36 and 38 may be utilized to provide a rather narrow band or wider band frequency transmission characteristic for the coupler so as to limit or expand the range of frequencies that are susceptible to transmission therethrough.

It should be noted that this point that no apparatus for measuring or controlling the temperature of the heat exchanger is illustrated or will it be discussed in detail since many conventional heat measuring and controlled devices, including thermopiles or thermocouples, may be utilized to control and measure the temperature of the heat exchanger in a fashion compatible for frequency tuning the output coupler 18 in accordance with the present invention. In addition, the heat exchanger arrangement illustrated in FIG. 4 should not be construed as a limitation on the invention since other heating or cooling apparatus might be utilized to provide a change in index of refraction of the fused quartz or the parallelism of the partial reflectance mirrors so as to provide tuning and correction of the output coupler in accordance with the invention as indicated by the illustrative embodiment thereof.

In summary, the fused quartz, with parallel spaced-apart mirrors or solid-state etalon, coupler may be considered an interferometer operating as an optical resonator which can be made to almost totally reflect light at certain frequencies, called reflection frequencies, and also totally transmit light at certain other frequencies, called transmission frequencies. Stated in another manner, the degree of energy transmission and the frequencies at which this occurs depends upon the degree of interference that occurs at the output mirror 38 of the coupler 18 as a result of the incident waves reflecting back and forth between the incident 36 and output 38 mirrors which are in turn controlled by the spacing therebetween, the index of refraction of the media therebetween and degree of parallelism therebetween. Thus, it can readily be seen that these factors can be controlled by the action of heat exchanger 48 as just discussed.

It is to be understood that the above-described embodiments of the invention are only illustrative of the principles applicable in the invention. Numerous other arrangements and modifications may be defined by those skilled in the art without departing from the spirit and scope of the invention. Accordingly, it is to be understood that the present invention is limited only by the spirit and scope of the appended claims.

What is claimed is:

1. In a device for generating a frequency coupling modulated light beam produced by phase coherent energy transfer between the oscillatory modes of an optical cavity the combination comprising, a pair of spaced-apart reflectance mirrors disposed along a common axis to form an optical cavity capable of sustaining oscillatory modes generated by an optical generating and amplification mechanism, means disposed within said optical cavity along said common axis for generating oscillatory modes characterized as having several electromagnetic field configurations, frequencies and frequency separations, optical modulator means disposed within said optical cavity along said common axis for modulating portions of said cavity modes to produce phase coherent energy transfer therebetween and for transferring substantially all of said phase coherent energy to one or more of said oscillatory modes for extraction, and where one of said spaced-apart reflectance mirrors provides an output coupling means coupled to said optical cavity and tuned to said one of said oscillatory modes for the extraction of energy therefrom.

2. The invention in accordance with claim 1 wherein said optical modulation means is further defined as including an excitation power source the output excitation frequency of which is substantially equal to half or multiple-halves of the frequency spacing between adjacent oscillatory modes of said optical cavity and said output coupling means is further defined as a solid-state etalon output coupler capable of being tuned to the frequency of any one of said oscillatory modes of the device.

3. A variable optical frequency response device for extracting optical energy from a frequency coupling modulated laser cavity capable of optical frequency translation the combination comprising, an etalon output coupler having a pair of spaced-apart parallel or concentric optical reflectance surfaces, said pair of reflectance surfaces separated by a medium having an index of refraction capable of being varied and having a frequency of operation dependent upon the spacing of said reflectance surfaces as defined by the thickness of said medium, and means for mechanically supporting said etalon output coupler and for varying the optical frequency response thereof by changing the index of refraction of said medium or by changing said spaced-apart relationship between said reflectance surfaces to provide an output means for coupling energy from said modulated laser cavity at a frequency where frequency translation has occurred.

4. The invention in accordance with claim 3 wherein said means is further defined as having a heat exchanger, with inlet and outlet connections for circulating fluids therethrough of varying temperatures for varying the temperature of said etalon coupler to thereby vary the optical frequency transmission response thereof.

5. A laser comprising:
a first reflectance mirror, and
a tunable solid state etalon disposed along a common axis defining a resonant cavity therebetween,
laser material within said cavity for generating a beam of coherent light having at least one electromagnetic field configuration and frequency along said common axis of said cavity,
pumping means for exciting said laser material,
second means disposed within said optical cavity along said common axis for optical frequency translation of a portion of said coherent light, and
where said tunable solid state etalon provides an output means for coupling energy therefrom at a frequency where frequency translation has occurred.

References Cited

UNITED STATES PATENTS

| 3,256,443 | 6/1966 | Moore | 331—94.5 |
| 3,358,243 | 12/1967 | Collins et al. | 331—94.5 |
| 3,444,479 | 5/1969 | Harris et al. | 331—94.5 |
| 3,422,370 | 1/1969 | Colling | 331—94.5 |

OTHER REFERENCES

"Ruby Laser Action at the $R_2$ Wave Length," Hubbard et al., Applied Optics, December 1964, vol. 3, No. 12, pp. 1499–1500.

"Rapid Scanning of Spectral Line Profiles Using an Oscillating Fabry-Perot Interferometer," Cooper et al., J. of Scientific Instruments, vol. 40, No. 9, September 1963, pp. 433–437.

"Mode Suppression and Single Frequency Operation in Gaseous Optical Masers," Kogelnik et al., Proceedings of the IRE, November 1962, pp. 2365–2366.

"Controlling Laser Oscillation," Harris et al., Electronics, Sept. 20, 1965, pp. 101–105.

RONALD L. WIBERT, Primary Examiner

V. P. McGRAW, Assistant Examiner

U.S. Cl. X.R.

356—112